Aug. 5, 1958 G. F. WAITE 2,845,997
FOAMED PLASTIC SEAT AND THE LIKE
Filed March 9, 1954 2 Sheets-Sheet 2
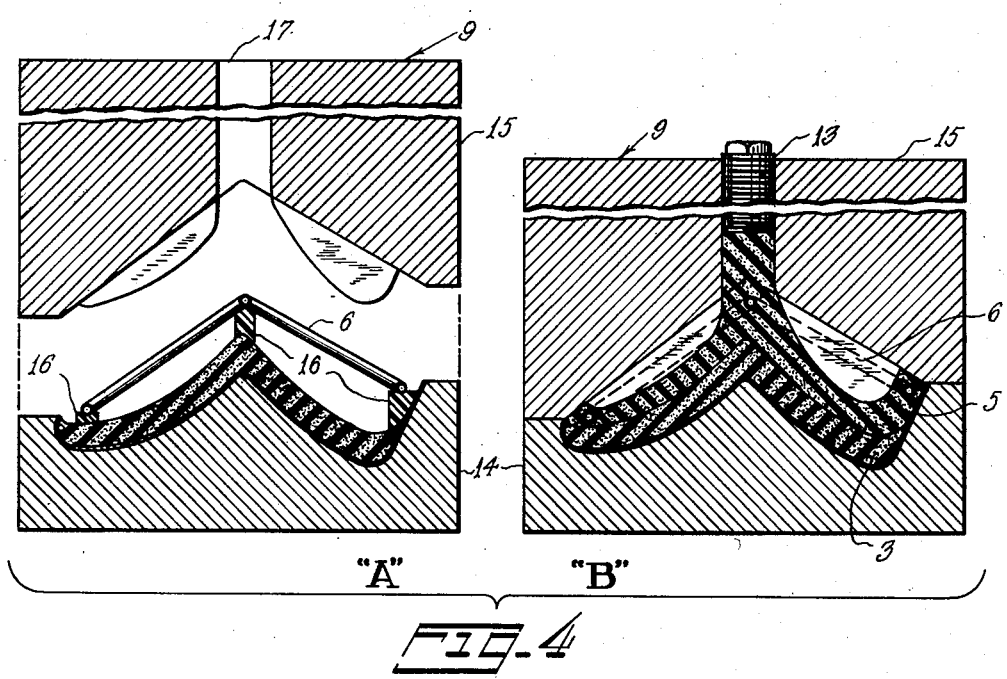
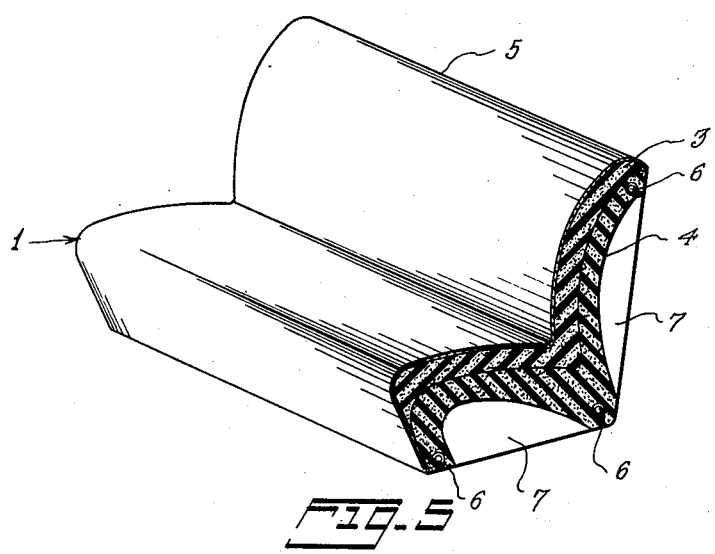
INVENTOR
GEORGE F. WAITE
BY
his ATTORNEY

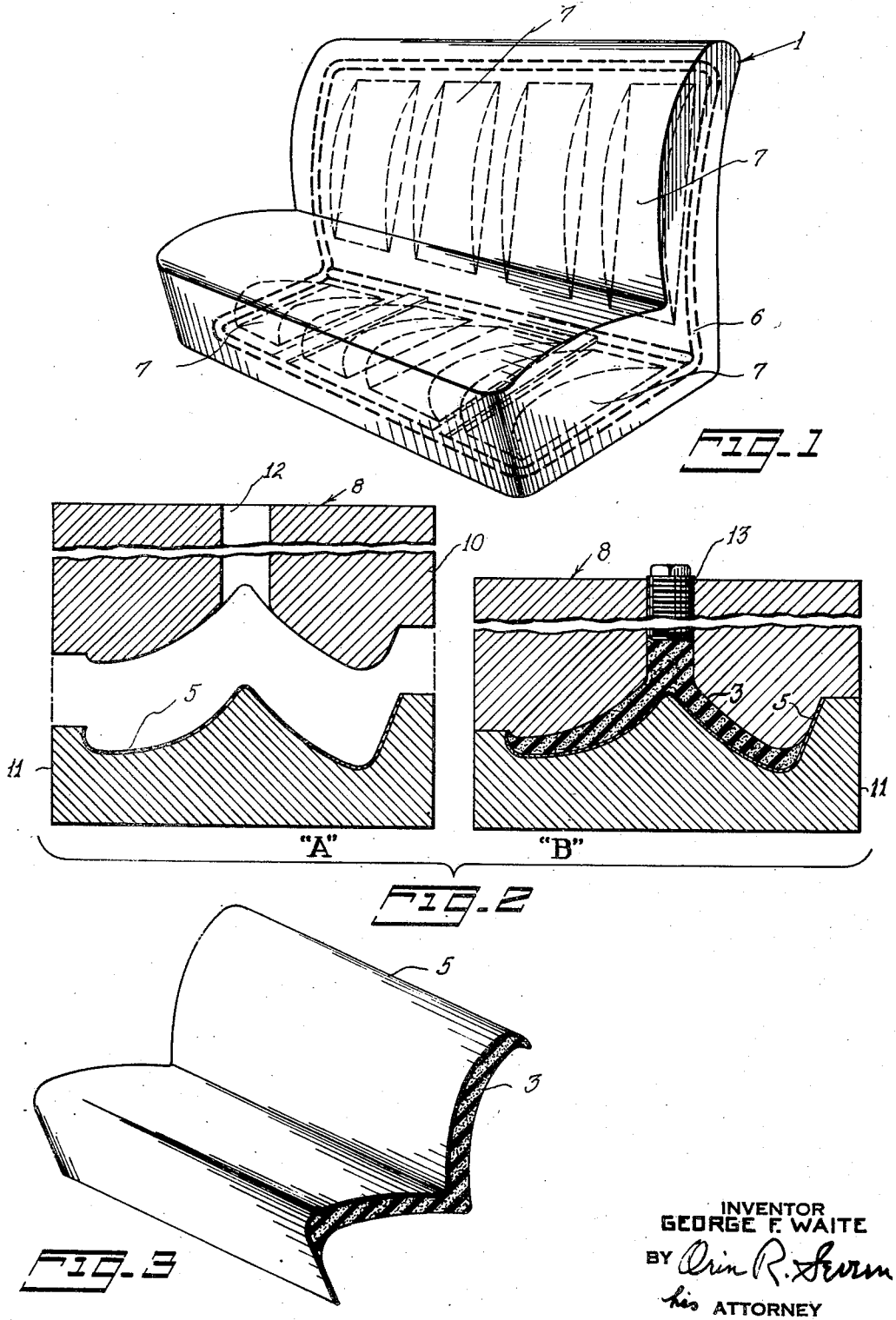

United States Patent Office 2,845,997
Patented Aug. 5, 1958

2,845,997

FOAMED PLASTIC SEAT AND THE LIKE

George F. Waite, Pelham, N. Y., assignor to Curtiss-Wright Corporation, a corporation of Delaware Application March 9, 1954, Serial No. 415,140

2 Claims. (Cl. 155—179)

My invention relates to a plastic foam rest support for the human body and to a method for its manufacture. The invention is particularly concerned with a seat for a motor vehicle but is not necessarily limited thereto.

It is a prime object of my invention to provide an inexpensive, comfortable and durable seat constructed for the most part, if not entirely, of low-density foamed plastic material, and to also provide a simple process for producing such a plastic seat whereby a maximum output can be obtained without the necessity of performing numerous and costly manual operations.

It is another object of my invention to provide a foamed plastic seat having two integrally bonded layers of foamed plastic material, one of the layers being soft and resilient to serve as a cushion and the other layer being rigid and strong to provide structural support.

The invention will be more fully set forth in the following description referring to the accompanying drawings and the features of novelty will be pointed out with particularity in the claims annexed to and forming a part of this specification.

Referring to the drawings:

Fig. 1 is a perspective view with interior structure indicated in dotted line of a plastic foam automobile seat embodying the features of my invention.

Fig. 2A is a cross-sectional view of a split mold for forming one of the foamed plastic layers of the seat, with the mold being shown in an open position; and Fig. 2B is a view similar to Fig. 2A with the mold shown in a closed and filled position.

Fig. 3 is a perspective sectional view showing the product of the mold of Fig. 2.

Fig. 4A is a cross-sectional view of a mold for forming the other of the foamed plastic layers of the seat, with the mold being shown in an open position; and Fig. 4B is a view similar to Fig. 4A but with the mold shown in a closed and filled position; and Fig. 5 is a perspective sectional view of a product of the mold of Fig. 4.

Referring to Fig. 1 of the drawings, reference character 1 designates a seat for a motor vehicle or the like which seat may, in accordance with the features of my invention, be constructed largely, if not entirely, of foamed plastic materials. The seat comprises two layers of foamed plastic material formed in a series of molding operations hereinafter described. The layers of foamed plastic material used in the seat are of different degrees of rigidity. A soft resilient layer 3 is provided for the top side or cushion part of the seat (see Fig. 5) and a strong and rigid foamed plastic layer 4 integrally bonded to the layer 3 is provided as a backing and support for the softer material. The soft resilient layer 3 serves as a cushion to provide comfortable riding for the user of the seat, whereas the rigid layer 4 provides structural support.

As shown rigid layer 4 is formed with a number of cored-out portions 7 in the back and at the bottom for the purpose of reducing the over-all weight and effecting economy in the use of materials. Preferably a covering of fabric 5 is provided over the outer layer 3 for the sake of appearance. Alternately, however, a vinyl plastic covering may be used or a sprayed plastic finish may be provided. As previously stated structural support may be provided by a layer of strong, rigid foamed plastic 4. Additional support may, however, be provided in the form of a metallic frame 6 embedded within the rigid layer 4. This frame 6 may be tubular in form as shown or may take any other desirable form having extensions to fit upon a conventional seat adjusting track ordinarily provided for the front seat of a modern automobile.

The foamed plastic seat is formed in a series of molding operations involving the use of split molds 8 and 9 shown respectively in Figs. 2 and 4. Split mold 8 has its mold cavity formed to provide for the formation of the outer layer 3 of the seat. In forming such outer layer 3 the movable portion 10 of split mold 8 is separated from the stationary lower half 11 and the forming surface of the mold cavity in stationary portion 11 is lined with a pliant sheet of fabric or other material suitable for forming the outer surface of the finished seat (Fig. 2A). In place of using sheet material the mold cavity of portion 11 may be sprayed with a plastic material which will adhere in bonded relation to the soft plastic layer 3 as it is formed and provide a satisfactory surface coating for the seat.

The movable portion 10 of the mold 8 is now closed and plastic foam material in liquid form is poured into the mold through the sprue opening 12. The material may be allowed to foam in the mold for a period of about twenty minutes to form outer layer 3 and is then cured in place in the mold at a temperature of about 50° C. for a period from 30 to 45 minutes. A plug 13 may be fitted at the sprue opening 12 to prevent loss of heat during the curing process.

When the curing process in mold 8 has been completed, the mold is opened and the product, shown in Fig. 3, comprising a solft plastic outer layer 3 and a layer of surface covering material 5, is removed. The soft plastic layer including its outer covering is now transferred to the split mold 9 where it is positioned in the lower stationary mold part 14 which is shaped to receive it. The mold 9 is constructed for forming the layer of rigid foam material 4 therein as a backing on the soft plastic layer 3. With the movable half 15 of mold 9 separated from the fixed half 14, a metallic frame 6 is suitably located and positioned on supporting blocks 16 in the mold so that the rigid foam material can be formed about the frame. The supporting blocks 16 are constructed of the same material as the rigid plastic foam layer 4 to be formed so that the blocks will merge into the rigid layer during the molding process. The mold is then closed and the plastic foam material in liquid form is poured into the mold through the sprue opening 17 and permitted to foam and solidify in a rigid state in place in the mold. The metal frame 6 is now rigidly embedded in the plastic layer 4. The material is cured in the mold as in the case of the soft plastic layer under similar temperature conditions and for a corresponding period of time. After curing, the seat which is now in final form (Fig. 5) is removed. The mold cavities of molds 8 and 9 are preferably coated with a suitable lubricant as known in the art to facilitate removal of the molded parts.

In carrying out the invention it is proposed that gas generating plastic foaming materials as for example the diisocyanate polyester foam materials be used for forming the resilient and rigid plastic layers respectively of the seat. Highly satisfactory results can be obtained in forming the plastic foam material for the intended purposes by reacting a diisocyanate with a polyester resin, an amine which is in solution in glycerol, and water, preferably in the presence of an emulsifier. Alternatively a glycol resin or epoxy resin may be used in place of the polyester resin. The emulsifier which may for example be a chlorinated diphenyl or morpholine compound may not enter into the chemical reaction but provides desirable physical properties in the resulting product. A satisfactory way of utilizing these materials for forming the foamed plastic is to mix the resin with the diisocyanate and store in a container until the foam material is to be formed, whereas the amine which is in solution in glycerol, the water, and the emulsifier may be mixed and stored in another container. The materials in one container can be mixed with the materials in the other container at the time the casting operation in either of molds 8 or 9 hereinbefore described is to be carried out, and the composite mixture then immediately poured into the mold. One way in which the rigidity of the plastic material can be controlled is by varying the proportions in which the ingredients are mixed. The greater the proportions of the polyester resins with diisocyanate in the plastic foam material, the softer and more resilient is the resulting product. Greater proportions of polyester resins with diisocyanate are therefore used in forming the soft resilient layer 3 of the seat in mold 8 than are used in forming the rigid layer 4 in mold 9. Instead of pouring the composite mixture into the mold cavities as hereinbefore described the material may alternatively be sprayed into the mold cavities through a suitable nozzle.

It will therefore be apparent that I have provided a seat construction which is economical, comfortable, durable and structurally sound, and which can be made entirely, or practically so, of foamed plastic materials. This results in a seat construction that is extremely light in weight while retaining good structural characteristics of strength and rigidity. The seat construction can be formed by casting merely by permitting foam materials of the type described to foam and solidify to varying degrees of hardness in properly selected molds thus eliminating the necessity for performing costly manual operations. Furthermore, the contemplated construction provides a superior product. The resilient cushion layer 3 of the seat formed in the manner indicated is far superior for a seat construction than so-called "foam rubber" heretofore used in the art. The cell structure of a foamed plastic cushion of suitable resiliency is such that it is not so easily compressed as foam rubber into a solid mass by the weight of a person sitting upon it, or by the sudden impact to which an automobile seat might be subjected as one drives over a bumpy road. A foamed plastic cushion is therefore not so likely to "bottom" on a supporting structure and thereby cause discomfort to the user.

It should be understood that this invention is not limited to specific details of construction and arrangement thereof herein illustrated, and that changes and modification may occur to one skilled in the art without departing from the spirit of the invention. In particular it is not intended that the invention be limited to a seat construction. Obviously the described structure can be easily adapted to other supporting structures for the body, as for example, a mattress, foot rest or the like and it is intended that the claims comprehend such modifications as being clearly within the scope of my invention.

What is claimed is:

1. A rest support for the human body comprising a strong, light-weight base member composed of a rigid, structurally strong and durable low-density foamed plastic, a metal supporting frame embedded in said base member, a cushion-like member forming a top layer on said base member and integrally bonded thereto composed of an elastic, low-density foamed plastic, said cushion-like member being adapted to support the human body with a minimum tendency to "bottom" on said base member, and a surface layer of pliant material integrally bonded to the elastic foamed plastic material.

2. A plastic foam seat comprising a unitary bottom and back structure of rigid foam plastic material; a metal reinforcing frame at least partially imbedded in and bonded to said rigid foam plastic material; and a cushioning layer of resilient foam plastic material overlying and bonded to said bottom and back structure.

References Cited in the file of this patent

UNITED STATES PATENTS

| | | |
|---|---|---|
| 1,484,731 | Malm | Feb. 26, 1924 |
| 1,843,893 | Becher | Feb. 2, 1932 |
| 2,150,287 | Minor | Mar. 14, 1939 |
| 2,180,304 | Minor | Nov. 14, 1939 |
| 2,290,614 | Rathbun | July 21, 1942 |
| 2,319,690 | Karpen | May 18, 1943 |
| 2,459,758 | Flint | Jan. 18, 1949 |
| 2,659,418 | Berman | Nov. 17, 1953 |